(12) United States Patent
Jiang

(10) Patent No.: US 11,269,512 B2
(45) Date of Patent: Mar. 8, 2022

(54) ANNOTATION DISPLAY METHOD, DEVICE, APPARATUS AND STORAGE MEDIUM

(71) Applicants: GUANGZHOU SHIYUAN ELECTRONICS CO., LTD., Guangdong (CN); GUANGZHOU SHIRUI ELECTRONICS CO. LTD., Guangdong (CN)

(72) Inventor: Lei Jiang, Guangdong (CN)

(73) Assignees: GUANGZHOU SHIYUAN ELECTRONICS CO., LTD., Guangdong (CN); GUANGZHOU SHIRUI ELECTRONICS CO. LTD., Guangdong (CN)

( * ) Notice: Subject to any disclaimer, the term of this patent is extended or adjusted under 35 U.S.C. 154(b) by 0 days.

(21) Appl. No.: 17/157,028

(22) Filed: Jan. 25, 2021

(65) Prior Publication Data
US 2021/0141527 A1 May 13, 2021

Related U.S. Application Data

(63) Continuation of application No. PCT/CN2018/118481, filed on Nov. 30, 2018.

(30) Foreign Application Priority Data
Sep. 4, 2018 (CN) .......................... 201811024700.9

(51) Int. Cl.
G06F 3/0484 (2022.01)
G06F 3/04883 (2022.01)
(Continued)

(52) U.S. Cl.
CPC .......... G06F 3/04883 (2013.01); G06F 3/041 (2013.01); G06F 3/0484 (2013.01); G06F 9/451 (2018.02); G06F 40/169 (2020.01)

(58) Field of Classification Search
CPC .... G06F 3/04883; G06F 9/451; G06F 40/169; G06F 3/041; G06F 3/0484; G06F 40/171; G06F 3/048
See application file for complete search history.

(56) References Cited

U.S. PATENT DOCUMENTS 6,342,906 B1 * 1/2002 Kumar .................... G06F 3/038
709/201
2006/0033724 A1 2/2006 Chaudhri et al.
(Continued)

FOREIGN PATENT DOCUMENTS

CN 103207731 A 7/2013
CN 104731443 A 6/2015
(Continued)

OTHER PUBLICATIONS

International Application No. PCT/CN2018/118481, International Search Report and Written Opinion dated May 29, 2019, 13 pages.
(Continued)

Primary Examiner — Jeanette J Parker
(74) Attorney, Agent, or Firm — Zhong Law, LLC

(57) ABSTRACT

The present disclosure, applying to the technical field of interaction intelligent tablets, relates to an annotation display method, device, apparatus and a storage medium. The method comprises: receiving touch data, wherein the touch data is data of a touch point caused by an annotation event that occurs on a touch screen of an interaction intelligent tablet; and displaying an annotation handwriting using the interaction intelligent tablet, wherein the annotation handwriting is obtained according to the touch data, and is drawn on a mouse layer; wherein the mouse layer is a transparent layer and is located above a system view layer. The embodiments of the present disclosure solve the problem that the system view cannot be refreshed when the writing accelera-
(Continued)

tion is performed, and at the same time realize the object of quickly displaying the annotation handwriting.

15 Claims, 3 Drawing Sheets

(51) Int. Cl.
*G06F 9/451* (2018.01)
*G06F 40/169* (2020.01)
*G06F 3/041* (2006.01)

(56) References Cited

U.S. PATENT DOCUMENTS

| 2012/0144283 | A1* | 6/2012 | Hill | G06F 40/169 |
| --- | --- | --- | --- | --- |
| | | | | 715/211 |
| 2013/0321314 | A1* | 12/2013 | Oh | G06F 3/04817 |
| | | | | 345/173 |
| 2014/0354559 | A1* | 12/2014 | Terunuma | G06K 9/00402 |
| | | | | 345/173 |
| 2015/0016336 | A1* | 1/2015 | Zehavi | H04L 65/1069 |
| | | | | 370/328 |
| 2016/0048398 | A1* | 2/2016 | Taylor | G06F 9/4843 |
| | | | | 717/168 |
| 2016/0154474 | A1* | 6/2016 | Park | G06F 3/0488 |
| | | | | 345/173 |
| 2020/0044003 | A1* | 2/2020 | Cho | G09F 9/30 |

FOREIGN PATENT DOCUMENTS

| CN | 104778008 A | 7/2015 |
| --- | --- | --- |
| CN | 107613203 A | 1/2018 |
| CN | 107743193 A | 2/2018 |
| CN | 107797971 A | 3/2018 |
| CN | 108235100 A | 6/2018 |
| CN | 108459836 A | 8/2018 |
| EP | 3742280 A1 | 11/2020 |
| WO | 2018077017 A1 | 5/2018 |

OTHER PUBLICATIONS

Chinese Application No. 201811301145.X, First Office Action dated Jun. 12, 2021, 13 pages.
European Application No. EP18932432 Supplementary European Search Report and Written Opinion dated Jul. 9, 2021, 9 pages.

* cited by examiner

ANNOTATION DISPLAY METHOD, DEVICE, APPARATUS AND STORAGE MEDIUM

CROSS-REFERENCE TO RELATED APPLICATIONS

This application is a continuation of International Application No. PCT/CN2018/118481, filed on Nov. 30, 2018 which claims priority to Chinese Patent Application No. 201811024700.9, filed on Sep. 4, 2018. Both of the above-identified applications are hereby incorporated by reference in their entireties.

FIELD OF THE INVENTION

The present disclosure relates to the technical field of interaction intelligent tablets, and in particular to an annotation display method, device, apparatus and a storage medium on an interaction intelligent tablet.

BACKGROUND OF THE INVENTION

In the field of interaction intelligent tablets, the annotation function has been widely used in work and study of people as one of the increasingly important functions of interaction intelligent tablets, which greatly improves the effectiveness of people's work and study. For example, in a meeting scenario, a user can annotate the content currently displayed on the interaction intelligent tablet, so that other participants can see the annotation content while viewing the displayed content using the interaction intelligent tablet, enabling the participants to more efficiently participate in the meeting and make decisions.

The annotation function can be implemented using an annotation application. After detecting a screen touching event, an Android system of the interaction intelligent tablet may send coordinate points to the annotation application to assemble the annotation handwritings desired by the user. Usually, one annotation handwriting is composed of a series of points. The refresh of the Android view is relatively slow, and cannot meet the needs of displaying immediately after writing, thereby requiring writing acceleration. Generally, FrameBuffer is used to achieve the writing acceleration.

In the process of implementing the present disclosure, it is realized that there are the following problems in the current technologies: when FrameBuffer is used by the annotation application, the Android system may also use FrameBuffer, which may result in mix-up of the views. In order to avoid this problem, the common practice is to prohibit the operation of the Android system (i.e., to freeze the screen) when the annotation application uses FrameBuffer. However, when freezing the screen, the refresh of Android view does not work when writing an annotation handwriting, failing to meet the requirements of the normal view refresh.

SUMMARY OF THE INVENTION

On the basis of this, it is necessary to provide an annotation display method, device, apparatus and a storage medium aiming at the problem that the existing methods cannot meet the requirements of the normal view refresh under the situation of writing acceleration.

A first aspect of the present disclosure provides an annotation display method, comprising:
receiving touch data, wherein the touch data is data of a touch point caused by an annotation event that occurs on a touch screen of an interaction intelligent tablet; and
displaying an annotation handwriting using the interaction intelligent tablet, wherein the annotation handwriting is obtained according to the touch data, and is drawn on a mouse layer;
wherein the mouse layer is a transparent layer and is located above a system view layer.

In one of the embodiments, the method further comprises:
in the case of determining writing acceleration, writing the received touch data into the mouse layer to draw the annotation handwriting using the mouse layer.

In one embodiment, the method further comprises:
starting a system of the interaction intelligent tablet; and
responsive to conclusion of starting the system, starting an annotation application, and prohibiting creating the system view layer corresponding to the annotation application.

In one of the embodiments, the method further comprises:
responsive to conclusion of starting the annotation application, initializing the mouse layer.

In one embodiment, prior to receiving the touch data, the method further comprises:
receiving a wake-up operation instruction, where the wake-up operation instruction is an instruction used to wake up the annotation application; and
switching the annotation application from running in a background to running in a foreground.

In one embodiment, the method further comprises:
receiving an operation instruction for exiting the writing acceleration, and exiting the writing acceleration.

In one embodiment, responsive to receiving the touch data, the method further comprises:
in the case of determining the exiting of the writing acceleration, writing the received touch data into the system view layer to draw the annotation handwriting using the system view layer; and
displaying the annotation handwriting drawn on the system view layer using the interaction intelligent tablet.

In one embodiment, the system is an Android system.
In one embodiment, receiving the touch data includes: receiving the touch data sent by the Android system.
In one embodiment, the method further comprises:
while displaying the annotation handwriting using the interaction intelligent tablet, refreshing displayed content of the system view layer.

A second aspect of the disclosure provides an annotation display device, comprising:
a data receiving module configured to receive touch data, wherein the touch data is data of a touch point caused by an annotation event that occurs on a touch screen of an interaction intelligent tablet; and
a displaying module configured to display an annotation handwriting using the interaction intelligent tablet, wherein the annotation handwriting is obtained according to the touch data, and is drawn on a mouse layer;
wherein the mouse layer is a transparent layer and is located above a system view layer.

In one embodiment, the device further comprises:
a first drawing module configured to, responsive to determining writing acceleration, write the received touch data into the mouse layer to draw the annotation handwriting using the mouse layer.

In one embodiment, the device further comprises:
an application starting module configured to, responsive to conclusion of starting a system, start an annotation application, and prohibit creating the system view layer corresponding to the annotation application.

In one embodiment, the device further comprises:

a mouse-layer starting module configured to, responsive to conclusion of starting the annotation application, initialize the mouse layer.

In one embodiment, the device further comprises:

a wake-up instruction module configured to receive a wake-up operation instruction, wherein the wake-up operation instruction is an instruction used to wake up the annotation application; and an application waking-up module configured to switch the annotation application from running in a background to running in a foreground.

In one embodiment, the device further comprises:

an acceleration exiting module configured to receive an operation instruction for exiting the writing acceleration, and exit the writing acceleration; or/and a second drawing module configured to, responsive to determining the exiting of the writing acceleration, write the received touch data into the system view layer to draw the annotation handwriting using the system view layer.

A third aspect of the disclosure provides annotation display apparatus, comprising: a memory, a display screen having a touch function, and one or more processors; wherein the memory is configured to store one or more programs;

when the one or more programs, when executed by the one or more processors, cause to perform the steps of an annotation display method in any one of the above-identified embodiments.

A fourth aspect of the disclosure provides a computer storage medium, wherein a computer program is stored on the computer storage medium, and when the computer program is executed by a processor, the one or more processors perform the steps of an annotation display method in any one of the embodiments.

By implementing the embodiments provided by the present disclosure, when the user wants to write an annotation on the interaction intelligent tablet, after receiving the touch data corresponding to the annotation, the annotation application can draw the annotation handwritings corresponding to the touch data using the mouse layer, and display the annotation handwritings drawn on the mouse layer using the interaction intelligent tablet. Since the mouse layer is a transparent layer and is located above the system view layer, it is possible to achieve the effect of displaying immediately after writing, thus improving the display efficiency of the annotation handwritings without affecting the normal refresh and display of the system view layer. Also, it is possible to take into account writing acceleration and normal view refresh, and furthermore satisfy the annotation needs of the user.

Furthermore, because of drawing annotation handwritings on the mouse layer, the system realizes that: the system of the interaction intelligent tablet only needs to start the annotation application one time during the entire period from startup to shut down, and the annotation application is started at boot time without creating the system view layer corresponding to the annotation application, further improving the efficiency of starting the annotation application, thereby solving the problem of slow startup of the annotation application of the interaction intelligent tablet.

DESCRIPTION OF THE PREFERRED EMBODIMENTS

Figure 1:
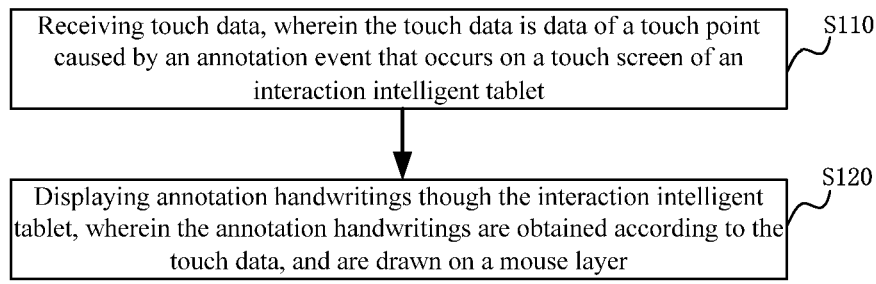
FIG. 1 is a schematic flowchart of an annotation display method according to an embodiment.

In order to make the objects, technical solutions, and advantages of the present disclosure clearer, the present disclosure will be described in further detail with reference to the drawings and embodiments hereinafter. It should be understood that the concrete embodiments described herein are only used to explain the present disclosure, but not to limit the present disclosure.

"Embodiments" mentioned in the present disclosure means that a specific feature, structure or characteristic described in conjunction with the embodiments can be included in at least one embodiment of the present application. The appearance of the phrase in various places in the description does not necessarily refer to the same embodiment, nor is it an independent or alternative embodiment mutually exclusive with other embodiments. Those skilled in the art explicitly and implicitly understand that the embodiments described in the present disclosure can be combined with other embodiments.

The annotation display method provided by the embodiments of the present application can be executed by annotation display apparatus. The annotation display apparatus can be implemented by software and/or hardware. The annotation display apparatus can be composed of two or more physical entities, or can be a physical entity. The annotation display apparatus can be a computer, a mobile phone, a tablet, a projector, an interaction intelligent tablet, or the like. In the embodiments, an interaction intelligent tablet is taken as an example of the annotation display apparatus for description, where the interaction intelligent tablet can be an integrated apparatus that controls the content displayed on the display tablet using the touch technology and realizes human-computer interaction. The interaction intelligent tablet integrates one or more functions such as a projector, an electronic whiteboard, a screen, a stereo, a television, and a video conference terminal.

In an embodiment, the display screen of the interaction intelligent tablet is a touch screen, and the touch screens includes a capacitive screen, an electromagnetic screen, an infrared screen, or the like. The touch screen can receive touch operations input by a user through a finger or an input device. Thereinto, the input device includes, but not limited to: a capacitive pen, an electromagnetic pen, and/or an infrared pen, etc.

In an embodiment, the main controller of the interaction intelligent tablet runs an Android system. In addition, the computing module communicating with the main controller can also run a PC system, such as a Windows system, that is, the user interface displayed using the interaction intelligent tablet can be the user interface of the Android system, or can be the user interface of the Windows system. The user can switch the interface display as needed.

Optionally, an annotation application software is installed in the interaction intelligent tablet. The annotation application software can be pre-installed in the above-mentioned interaction intelligent tablet, or can be downloaded from a third-party apparatus or server and installed and used after the interaction intelligent tablet is started. Thereinto, the third-party apparatus is not limited in this embodiment. Specifically, the annotation application software is used to implement the function of annotating the content displayed on the interaction intelligent tablet, for example, the function of annotating the content displayed on the projection screen of the interaction intelligent tablet.

In one embodiment, as shown in FIG. 1, an annotation display method includes the steps of:

S110, receiving touch data, where the touch data includes data of a touch point caused by an annotation event that occurs on a touch screen of an interaction intelligent tablet.

Thereinto, the annotation event is an event used to instruct the interaction intelligent tablet to further display annotation handwritings on the currently displayed content, and the specific form of the annotation event can be set according to the actual situation. For example, when the interaction intelligent tablet detects a touch operation on the touch screen after waking up the annotation application, the touch operation is determined as an annotation event. In another example, setting a trigger button, the trigger button can be a physical button or a virtual button, and can be located on the interaction intelligent tablet or a terminal apparatus wirelessly connected with the interaction intelligent tablet. When an annotation is required, the user can operate this trigger button, and when the interaction intelligent tablet detects an operation event such as clicking, double-clicking and long-pressing of this trigger button, the operation event is determined as an annotation event.

Thereinto, the touch point caused by the annotation event generally includes multiple points. For example, the user annotates a paragraph of text or annotates a graph, and the paragraph of text or graph can be composed of multiple points and therefore corresponds to multiple touch points. The data of the touch points include the coordinate information of the touch points on the display interface. In addition, the data of the touch points can further include information such as the size and touch intensity of the touch points.

In the embodiment, this step can be understood as: the annotation application receives touch data sent by a main system of the interaction intelligent tablet. When an annotation event occurs on the touch screen of the interaction intelligent tablet, the main system of the interaction intelligent tablet can detect the touch data corresponding to the event. If the annotation application is in a wake-up state (which can be understood as a foreground running state), the acquired touch data is handed over to the annotation application for processing.

S120, displaying annotation handwritings using the interaction intelligent tablet, where the annotation handwritings are obtained according to the touch data, and are drawn on a mouse layer. Thereinto, the mouse layer is a transparent layer and is located above a system view layer.

Figure 2:
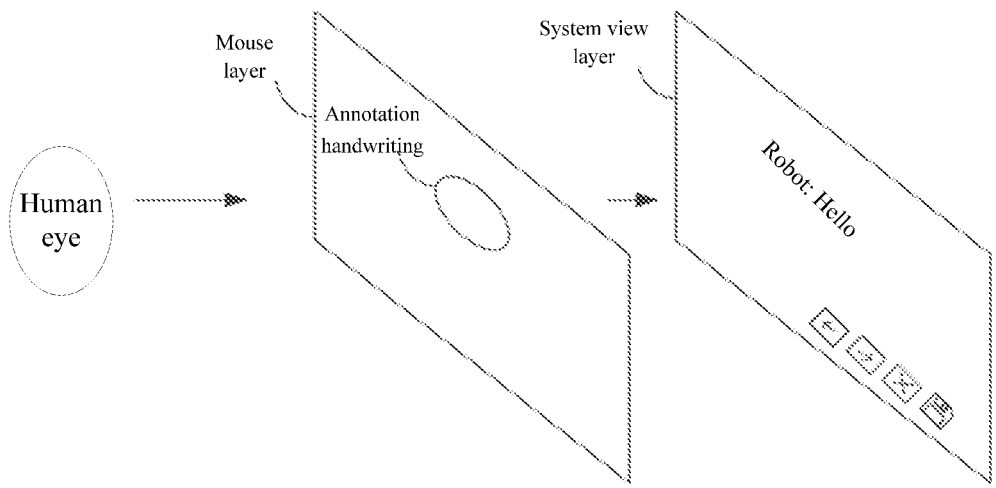
FIG. 2 is a schematic effect diagram of a mouse layer and a system view layer according to an embodiment.
Figure 3:
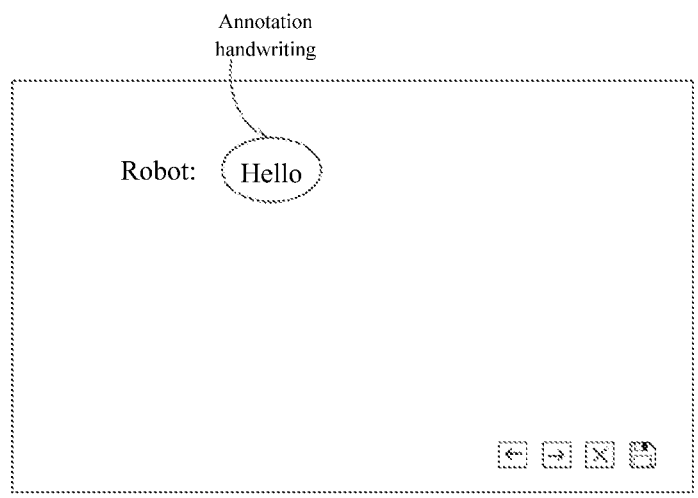
FIG. 3 is an effect diagram of annotation handwritings seen by a user according to an embodiment.

Thereinto, the annotation handwritings can be drawn using the drawing interface of the system. For example, the interfaces of Android system such as Canvas and Path implement the drawing function of the annotation handwriting. The annotation handwritings displayed at step S120, that is, the handwritings written by the user on the touch screen of the interaction intelligent tablet, are shown in FIG. 2. In this embodiment, the annotation handwritings are drawn on the mouse layer. The mouse layer is a transparent layer, and is independent of the system view layer, and is located above the system view layer. Interaction intelligent tablets generally support mouse control. In order to realize that a mouse will not be stuck due to the stuck of the tablet system when the interaction intelligent tablet is matched with the mouse, usually, the mouse is specially optimized to make the mouse icon and the tablet system view are drawn using two different display layers, and the contents of the two display layers are mixed at the hardware level in the final display. For example, the user's current annotation operation is to annotate and circle the content of "Hello", and the corresponding contents of the mouse layer and the system view layer are shown in FIG. 2. After mixing the contents of the two display layers at the hardware level, the effective display from the perspective of the user is shown in FIG. 3.

In the traditional way of writing acceleration, the drawing method of the annotation handwritings are: to use Frame-Buffer to directly operate on a display buffer. The Frame-Buffer apparatus abstracted from Linux kernel is used for the user process to realize direct writing-screen operation. FrameBuffer mechanism imitates the function of a video card, abstracts away the hardware structure of the video card, and can directly operate the video memory by reading and writing to FrameBuffer. FrameBuffer can be regarded as a mapping of the video memory. After FrameBuffer is mapped to an address space of the process, reading and writing operations can be performed directly, and the writing operation can be immediately reflected on the screen. This operation is abstract and unified. The annotated handwritings can be displayed immediately after writing through FrameBuffer. However, because the Android system also writes data to FrameBuffer, the picture may be chaotic, for example, the previous annotations of the user may be overwritten. Therefore, when the writing acceleration is used, the refresh of the Android system view layer needs to be disabled, and therefore the screen is frozen. Therefore, the refresh of the Android system view layer does not work at the time of the writing acceleration.

In the above-mentioned embodiment, since the refresh of the tablet system view layer does not affect the drawing of the mouse layer, the screen may not be frozen when the writing acceleration is started. Therefore, the annotation handwritings can be immediately displayed when the user makes an annotation, and simultaneously, the tablet system view layer can also be refreshed normally. And there will be no screen disorder, namely without the problem that the annotation handwritings written by the user is cleared by the refresh.

According to this embodiment of the present disclosure, when the user intends to write an annotation on the interaction intelligent tablet, after the annotation application receives the touch data corresponding to the annotation, it is possible to draw the annotation handwritings corresponding to the touch data using the mouse layer, and display the annotation handwritings drawn on the mouse layer using the interaction intelligent tablet. Since the mouse layer is a transparent layer and is located above the system view layer, it is possible to achieve the effect of displaying immediately after writing, thus improving the display efficiency of the annotation handwritings without affecting the normal refresh and display of the system view layer. Also, it is possible to achieve both the writing acceleration and normal view refresh, further satisfying the annotation needs of the user.

Figure 4:
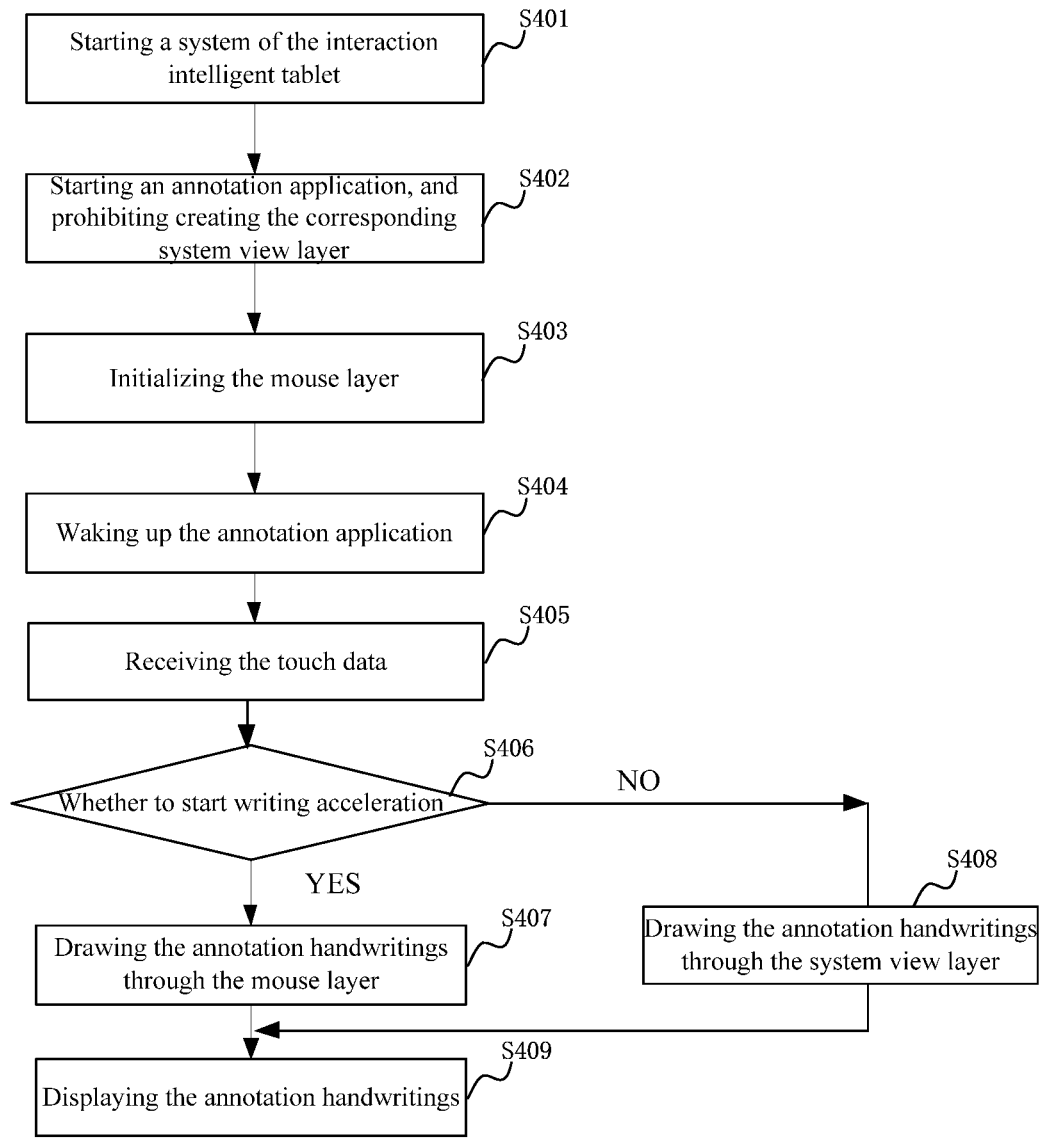
FIG. 4 is a schematic flowchart of an annotation display method according to another embodiment.

Furthermore, FIG. 4 provides an annotation display method of another embodiment. In this embodiment, the Android system is taken as an example for description. The method in particular includes the steps of:

S401, starting a system of the interaction intelligent tablet.

In some embodiments, the implemented approach of this step may include: receiving a second operation instruction, and starting the system, wherein the second operation instruction is an instruction used to start the system. Specifically, the system startup process can refer to the existing interaction intelligent tablet.

Thereinto, the specific form of the second operation instruction can be set according to the actual situation. For example, under a turning-off or sleep state of the interaction intelligent tablet, when a touch operation is detected on the touch screen and recognized as a set touch operation, such as a specific touch gesture, at the time of detecting the touch operation, it determines that the second operation instruction is received. In another example, a system starting button is set. The system starting button can be a physical button or a virtual button, and can be located on the interaction intelligent tablet or a terminal apparatus wirelessly connected with the interaction intelligent tablet. When the system needs to be started, the user can operate this system starting button. When the interaction intelligent tablet detects an operation such as clicking, double-clicking and long-pressing this system starting button, it determines that the second operation instruction is received.

S402, starting an annotation application, and prohibiting the creation of the system view layer corresponding to the annotation application.

In this embodiment, at the end of starting the system, an annotation application is started, and the creation of the system view layer corresponding to the annotation application is prohibited. Normally, in the process of starting the annotation application, the system view layer corresponding to the annotation application is automatically created. The view layer is a part that carries the handwritings or content and is used to draw the final display content. Android system creates a corresponding view for an application during the process of starting the application, which will consume a certain amount of time, resulting in a longer time to start the application. Specifically, as to the annotation application, it may take a long time to starting the annotation application in the traditional way, and the user may need to wait.

In this embodiment, there is no need to create a corresponding system view layer when starting the annotation application, so that the annotation application can be quickly started.

S403, initializing the mouse layer.

In this embodiment, at the end of starting the annotation application, the mouse layer is initialized.

The mouse layer is a view layer corresponding to the drawing of the mouse icon. The mouse layer is independent of the system view layer, and is located above the system view layer, and is a transparent layer. Using the mouse layer, the view layer below the mouse layer can be seen. It should be noted that the mouse layer may be a 100% transparent layer, that is, a completely transparent view layer, or a transparent layer with other degrees of transparencies, such as an 80% transparent layer.

S404, waking up the annotation application.

In this embodiment, the annotation application is started at boot time, and the system of the interaction intelligent tablet only needs to start the annotation application once during the entire period from startup to shut down. When the user needs to make an annotation, only the annotation application needs to be woken up, which further saves the time consumption of restarting the annotation application.

In one embodiment, the implemented approach of this step in particular includes: receiving a third operation instruction, and switching the annotation application from running in a background to running in a foreground, where the third operation instruction includes an instruction used to wake up the annotation application. The process of switching the annotation application from running in the background to running the foreground is the process of waking up the annotation application.

Thereinto, the specific form of the third operation instruction can be set according to the actual situation. For example, in a case that the annotation application of the interaction intelligent tablet is running in the background, when a touch operation on the touch screen is detected and recognized as a set touch operation, such as a specific touch gesture (this touch gesture is different from the above-mentioned touch gesture of starting the system of the interaction intelligent tablet). Responsive to detecting this touch operation, the interaction intelligent tablet determines that the third operation instruction is received. For another example, a wake-up button is set. The wake-up button can be a physical button or a virtual button, and can be located on the interaction intelligent tablet or a terminal apparatus wirelessly connected with the interaction intelligent tablet. When the annotation application needs to be woken up, the user can operate this wake-up button. When the interaction intelligent tablet detects an operation such as clicking, double-clicking or long-pressing this wake-up button, it determines that the third operation instruction is received.

S405, receiving the touch data.

Taking the Android system as an example, this step is that the annotation application receives the touch data sent by the Android system, where the touch data includes data of multiple touch points.

S406, judging whether to start writing acceleration, if so, step S407 is executed, otherwise, step S408 is executed.

In one embodiment, the user can select whether the writing acceleration is necessary. If necessary, the user can select to start the function of writing acceleration, for example, receiving the first operation instruction, and writing the received touch data into the mouse layer to draw the annotation handwritings using the mouse layer, that is, executing the next step, where the first operation instruction is an instruction used to start the writing acceleration.

Thereinto, the specific form of the first operation instruction can be set according to the actual situation. For example, after waking up the annotation application, when the interaction intelligent tablet detects a touch operation on the touch screen and recognizes the touch operation as a set touch operation, such as a specific touch gesture (this touch gesture is different from the above-mentioned touch gesture of starting the system of the interaction intelligent tablet, and also different from the gesture of starting the annotation application), at the time of detecting the touch operation, it determines that the first operation instruction is received. For another example, a starting button is set. The starting button can be a physical button or a virtual button, and can be located on the interaction intelligent tablet or a terminal apparatus wirelessly connected with the interaction intelligent tablet. When the writing acceleration needs to be performed, the user can operate the starting button. When the interaction intelligent tablet detects an operation such as clicking, double-clicking or long-pressing the starting button, it determines that the first operation instruction is received.

S407, writing the received touch data into the mouse layer to draw the annotation handwritings using the mouse layer, then, displaying the annotation handwritings drawn on the mouse layer using the interaction intelligent tablet, and concluding the routine.

The mouse layer is used to replace the FrameBuffer that is under the traditional writing acceleration state to draw the annotation handwriting. Since the refresh of the Android system view layer does not affect the drawing of the mouse layer, it is possible to realize the operation of non-freezing screen while performing the writing acceleration, which solves the problem that the refresh of the Android system view layer is not allowed during the writing acceleration according to the traditional methods. Therefore, while displaying the annotation handwritings using the interaction intelligent tablet, the refreshed content of the system view layer can also be displayed at the same time.

S408: writing the received touch data into the system view layer to draw the annotation handwritings using the system view layer. Then, the annotation handwritings drawn on the system view layer is displayed using the interaction intelligent tablet.

In the embodiment, the implemented approach of drawing the annotation handwritings using the touch data in particular may use a 2D drawing interface provided by the Android system itself, such as Canvas or Path. The annotation handwritings can be drawn in an accelerated or normal manner (the annotation handwritings in the accelerated and normal manners are drawn on different layers), and then the annotation handwritings are synthesized and displayed using the Android hardware layer.

In addition, after selecting the writing acceleration, the user can also select to exit the writing acceleration. After exiting the writing acceleration, the annotation handwritings are displayed according to the normal process of the Android system. The implementation process can include: receiving a fourth operation instruction, and writing the received touch data into the system view layer to draw the annotation handwritings using the system view layer, where the fourth operation instruction may include an instruction used to exit the writing acceleration.

Thereinto, the specific form of the fourth operation instruction can be set according to the actual situation. For example, in a case that the writing acceleration of the interaction intelligent tablet has been started, when the interaction intelligent tablet detects a touch operation on the touch screen and recognizes the touch operation as a set touch operation, such as a specific touch gesture, at the time of detecting the touch operation, it determines that the fourth operation instruction is received. For another example, an exiting acceleration button is set. The exiting acceleration button can be a physical button or a virtual button, and can be located on the interaction intelligent tablet or a terminal apparatus wirelessly connected with the interaction intelligent tablet. When the writing acceleration needs to be exited, the user can operate the exiting acceleration button. When the interaction intelligent tablet detects an operation such as clicking, double-clicking and long-pressing the acceleration exiting button, it determines that the fourth operation instruction is received.

Based on this, when the user needs to make an annotation on the interaction intelligent tablet, the user can select whether to perform the writing acceleration. If so, the written annotation handwritings are drawn using the mouse layer, so as to achieve the effect of displaying immediately after writing. If the writing acceleration is not required, the normal annotation drawing method of the system is used to perform drawing using the corresponding system view layer, so as to meet the annotation requirements of different scenarios.

It should be understood that, for the above-mentioned method embodiments, although the steps in the flowchart are displayed in sequence as indicated by the arrows, these steps are not necessarily performed in sequence in the order indicated by the arrows. Unless explicitly stated in the present disclosure, the execution of these steps is not strictly limited in order, and these steps can be executed in other orders. Moreover, at least part of the steps in the flowchart of the method embodiment can include multiple sub-steps or multiple stages. These sub-steps or stages are not necessarily executed at the same time, but can be executed at different times. The execution order of these sub-steps or stages is not necessarily carried out sequentially, but can be executed in turn or alternately with at least a part of other steps or sub-steps or stages of other steps.

Based on the same idea as the annotation display method in the above-mentioned embodiment, the present disclosure also provides an annotation display device.

Figure 5:
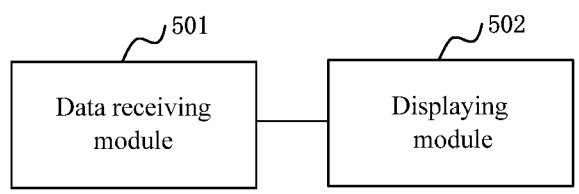
FIG. 5 is a schematic structure diagram of an annotation display device according to an embodiment.

In one embodiment, as shown in FIG. 5, the annotation display device in this embodiment includes: a data receiving module 501 and a displaying module 502. Hereinafter, each module will be described in detail.

The data receiving module 501 is configured to receive touch data, where the touch data may include data of a touch point caused by an annotation event that occurs on a touch screen of an interaction intelligent tablet.

The displaying module 502 is configured to display annotation handwritings using the interaction intelligent tablet, wherein the annotation handwritings are obtained according to the touch data, and are drawn on a mouse layer. Thereinto, the mouse layer is a transparent layer and is located above a system view layer.

In one embodiment, in the annotation display device, the data receiving module 501 is particularly configured to receive the touch data sent by Android system.

Figure 6:
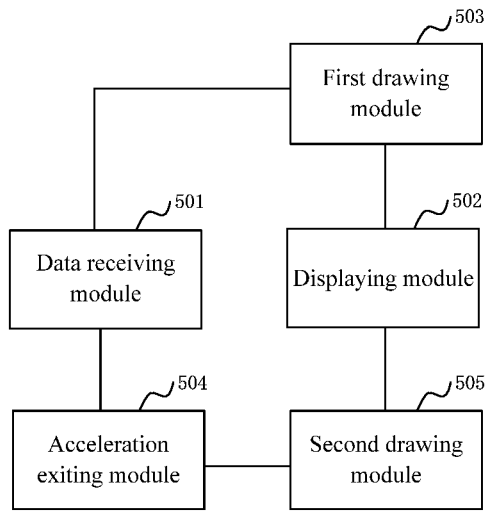
FIG. 6 is a schematic structure diagram of an annotation display device according to another embodiment.

Subsequently, with reference to FIG. 6, in one embodiment, the above-mentioned annotation display device further includes:

a first drawing module 503 configured to, in the case of determining writing acceleration, write the received touch data into the mouse layer to draw the annotation handwritings using the mouse layer.

In addition, the above-mentioned annotation display device may further include:

a first instruction module configured to receive a first operation instruction, wherein the first operation instruction is an instruction used to start the writing acceleration, and a first starting module configured to start the writing acceleration.

In one embodiment, the above-mentioned annotation display device may further include:

an application starting module configured to, at the end of starting a system of the interaction intelligent tablet, start an annotation application, and prohibit creating the system view layer corresponding to the annotation application.

In addition, the above-mentioned annotation display device further includes: a system starting module configured to start the system of the interaction intelligent tablet.

Furthermore, in other embodiments, the above-mentioned annotation display device further includes: a second instruction module configured to receive a second operation instruction, wherein the second operation instruction is an instruction used to start the system of the interaction intelligent tablet.

In one embodiment, the above-mentioned annotation display device further includes: a mouse-layer starting module configured to, at the end of starting the annotation application, initialize the mouse layer.

In one embodiment, the above-mentioned annotation display device further includes:

a wake-up instruction module configured to receive a wake-up operation instruction, wherein the wake-up operation instruction is an instruction used to wake up the annotation application, and an application waking-up module configured to switch the annotation application from running in a background to running in a foreground.

Subsequently, with reference to FIG. 6, in one embodiment, the above-mentioned annotation display device further includes:

an acceleration exiting module 504 configured to receive an operation instruction for exiting the writing acceleration, and exit the writing acceleration, or/and a second drawing module 505 configured to, in the case of determining the exiting of the writing acceleration, write the received touch data into the system view layer to draw the annotation handwritings using the system view layer.

In one embodiment, the above-mentioned annotation display device further includes:

the displaying module 502 further configured to display the annotation handwritings on the system view layer using the interaction intelligent tablet.

In one embodiment, the system is the Android system.

For the concrete limitation of the annotation display device, it can reference to the limitation of the annotation display method mentioned above, which will not be repeated herein. Each module in the above-mentioned annotation display device can be implemented in whole or in part by software, hardware, and a combination thereof. The above-mentioned modules can be embedded in or independent of the processor of the device in the form of hardware, or can be stored in the memory of the device in the form of software, so that the processor can call and execute the operations corresponding to the above-mentioned modules.

In addition, in the above-exemplified implementation of the annotation display device, the logical division of each program module is only an example, and in actual applications, according to the need, such as in consideration of the configuration requirements of the corresponding hardware or the convenience of the realization of the software, the above-mentioned functions are allocated to be completed by different program modules, that is, the internal structure of the annotation display device is divided into different program modules to complete all or part of the functions.

Figure 7:
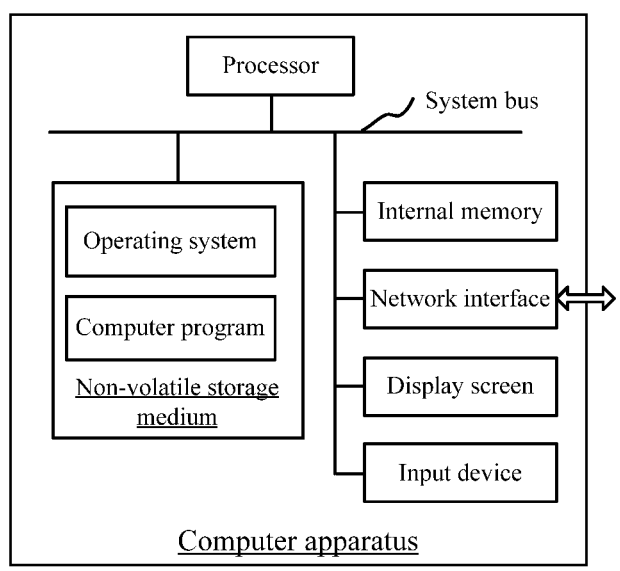
FIG. 7 is an internal structure diagram of an annotation display device according to an embodiment.

One embodiment provides annotation display apparatus, and its internal structure diagram can be as shown in FIG. 7. The apparatus includes a processor, a memory, a network interface, a display screen and an input device connected via a system bus. Thereinto, the processor is configured to provide computing and control capabilities. The memory includes a non-volatile storage medium and an internal memory, wherein the non-volatile storage medium stores an operating system and a computer program, and the internal memory provide an environment for running the operating system and computer program in the non-volatile storage medium. The network interface is configured to communicate with an external terminal through a network connection. The computer program is executed by the processor to realize an annotation display method. The display screen can be a liquid crystal display or an electronic ink display. The input device can be a touch layer covered on the display screen, or can be a button, a trackball or a touchpad provided on the device casing, or can be an external keyboard, a touchpad, or a mouse.

Those skilled in the art can understand that the structure shown in FIG. 7 is only a block diagram of part of the structure related to the solution of the present application, and does not constitute a limitation on the annotation display device of the present application solution applied thereto. The concrete annotation display device can include more or fewer components than those shown in the figures, or combine certain components, or have a different component arrangement.

One embodiment provides an annotation display device, including: a memory, a display screen having a touch function and one or more processors; where the memory is configured to store one or more programs, when the one or more programs are executed by the one or more processors, the one or more processors are caused to implement the steps of:

receiving touch data, wherein the touch data include data of a touch point caused by an annotation event that occurs on a touch screen of an interaction intelligent tablet, and displaying annotation handwritings using the interaction intelligent tablet, where the annotation handwritings are obtained according to the touch data, and are drawn on a mouse layer, where the mouse layer is a transparent layer and is located above a system view layer.

In some embodiments, when the computer program is executed by the processor, the processor is further caused to implement the steps of the annotation display method in other embodiments mentioned above.

One embodiment provides a computer-readable storage medium, wherein a computer program is stored on the computer-readable storage medium, and when the computer program is executed by a processor, the steps are implemented:

receiving touch data, wherein the touch data include data of a touch point caused by an annotation event that occurs on a touch screen of an interaction intelligent tablet, and displaying annotation handwritings using the interaction intelligent tablet, where the annotation handwritings are obtained according to the touch data, and are drawn on a mouse layer, where the mouse layer is a transparent layer and is located above a system view layer.

In some embodiments, when the computer program is executed by the processor, the steps of the annotation display method in other embodiments mentioned above are further implemented.

Those skilled in the art can understand that the realization of all or part of the processes in the above-mentioned embodiment methods can be implemented by instructing relevant hardware with a computer program. The computer program can be stored in a non-volatile computer-readable storage medium. When the computer program is executed, it can include the processes of the embodiments of the above-mentioned method. Thereinto, any reference to the memory, the storage, the database or other media used in the embodiments provided in the present application can include non-volatile and/or volatile memories. Non-volatile memories can include read only memory (ROM), programmable ROM (PROM), electrically programmable ROM (EPROM), electrically erasable programmable ROM (EEPROM), or flash memory. Volatile memories can include random access memory (RAM) or external cache memory. As an illustration and not a limitation, RAM is available in many forms, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM), Rambus direct RAM (RDRAM), Direct Rambus Dynamic RAM (DRDRAM), and Rambus Dynamic RAM (RDRAM), etc.

The technical features of the above embodiments can be combined arbitrarily. To make the description concise, not all possible combinations of the technical features in the above embodiments are described. However, as long as there is no contradiction in the combination of these technical features, the combination of these technical features should be regarded as the scope of this description. The description of each of the above-mentioned embodiments has its own focus. For parts that are not described in detail in a certain embodiment, reference can be made to related descriptions of other embodiments.

The terms "including" and "having" in the embodiments and any variations thereof are intended to cover non-exclusive inclusion. For example, a process, a method, a system, a product, or a device that includes a series of steps or (modules) units is not limited to the listed steps or units, but optionally also includes unlisted steps or units, or optionally also includes other steps or units inherent in these processes, methods, products or devices.

The "multiple" mentioned in the embodiments means two or more. "And/or" describes the association relationship of the associated objects, indicating that there can be three types of relationships. For example, A and/or B can mean: A exists alone, A and B exist at the same time, and B exists alone. The character "/" generally indicates that the associated objects are in an "or" relationship.

The "first/second" mentioned in the embodiments only distinguishes similar objects, and does not represent a specific order for the objects. It should be understood that "first/second" can be interchanged in a specific order or precedence when permitted. It should be understood that the objects distinguished by "first/second" can be interchanged under appropriate circumstances, so that the embodiments described herein can be implemented in an order other than those illustrated or described herein.

The above embodiments only express several implementations of the present disclosure, but cannot be understood as limiting the scope of the disclosure patent. It should be pointed out that for those skilled in the art, without departing from the concept of the present application, several modifications and improvements can be made, which all fall within the claimed scope of the present application. Therefore, the claimed scope of the patent of the present application shall be subject to the appended claims.

What is claimed is:

1. An annotation display method, comprising:
responsive to conclusion of starting an annotation application, initializing a mouse layer, wherein the mouse layer is a transparent layer that is located above a system view layer of an interaction intelligent tablet;
receiving touch data, wherein the touch data comprise data of a touch point caused by an annotation event that occurs on a touch screen of the interaction intelligent tablet, and the annotation event is an event used to instruct the interaction intelligent tablet to display an annotation handwriting overlaying on a currently displayed content;
displaying the annotation handwriting using the interaction intelligent tablet, wherein the annotation handwriting is obtained according to the touch data, and is drawn on the mouse layer corresponding to a drawing of a mouse icon;
while displaying the annotation handwriting using the interaction intelligent tablet, displaying a refreshed content of the system view layer;
overlaying and displaying the mouse layer and the refreshed content of the system view layer;
receiving an operation instruction for exiting the writing acceleration, and exiting the writing acceleration;
responsive to determining the exiting of the writing acceleration, writing the received touch data into the system view layer to draw the annotation handwriting using the system view layer; and
displaying the annotation handwriting drawn on the system view layer using the interaction intelligent tablet.

2. The method according to claim 1, further comprising:
responsive to determining writing acceleration, writing the received touch data into the mouse layer to draw the annotation handwriting using the mouse layer.

3. The method according to claim 1, further comprising:
responsive to conclusion of starting a system of the interaction intelligent tablet, starting the annotation application, and prohibiting displaying the refreshed content in the system view layer corresponding to the annotation application.

4. The method according to claim 1, wherein the annotation event comprises at least one of an operation event for a preset trigger button or a touch operation event on the touch screen that is detected by the interaction intelligent tablet after the annotation application is started.

5. The method according to claim 1, prior to receiving the touch data, the method further comprising:
receiving a wake-up operation instruction, wherein the wake-up operation instruction comprises an instruction used to wake up the annotation application; and
switching the annotation application from running in a background to running in a foreground.

6. The method according to claim 1, wherein the interaction intelligent tablet runs an operating system.

7. The method according to claim 6, wherein receiving the touch data comprises receiving the touch data sent by the operating system.

8. The method according to claim 6, wherein the annotation application is started responsive to starting the operating system of the interaction intelligent tablet, and responsive to receiving the annotation event, the interaction intelligent tablet wakes up the annotation application.

9. The method according to claim 8, wherein waking up the annotation application further comprises:
receiving a third operation instruction, and switching the annotation application from running in a background to running in a foreground, wherein the third operation instruction is an instruction used to wake up the annotation application.

10. The method according to claim 9, wherein the third operation instruction is triggered by a touch gesture or a wake-up button, the wake-up button comprises one of a physical button or a virtual button, and the virtual button is located on the interaction intelligent tablet or on a terminal apparatus wirelessly connected with the interaction intelligent tablet.

11. An annotation display device, comprising:
a data receiving module configured to receive touch data, wherein the touch data comprise data of a touch point caused by an annotation event that occurs on a touch screen of an interaction intelligent tablet;
a displaying module configured to display an annotation handwriting using the interaction intelligent tablet, wherein the annotation handwriting is obtained according to the touch data, and is drawn on a mouse layer of the display module, and wherein the mouse layer is a transparent layer located on top of a system view layer of the display module;

a first drawing module configured to, responsive to determining writing acceleration, write the received touch data into the mouse layer to draw the annotation handwriting using the mouse layer;

an acceleration exiting module configured to receive an operation instruction for exiting the writing acceleration, and exit the writing acceleration; and a second drawing module configured to, responsive to determining the exiting of the writing acceleration, write the received touch data into the system view layer to draw the annotation handwriting using the system view layer.

12. The device according to claim 11, further comprising:

an application starting module configured to, responsive to conclusion of starting a system of the interaction intelligent tablet, start an annotation application, and prohibit displaying the refreshed content in the system view layer corresponding to the annotation application.

13. The device according to claim 12, further comprising:

a mouse-layer starting module configured to, responsive to conclusion of starting the annotation application, initialize the mouse layer.

14. The device according to claim 12, further comprising:

a wake-up instruction module configured to receive a wake-up operation instruction, wherein the wake-up operation instruction is an instruction used to wake up the annotation application; and an application waking-up module configured to switch the annotation application from running in a background to running in a foreground.

15. An annotation display apparatus, comprising: a memory, a display screen having a touch function and one or more processors; wherein the display screen comprises at least one of a capacitive screen, an electromagnetic screen, or an infrared screen;

the memory is configured to store one or more programs;

when the one or more programs are executed by the one or more processors, the one or more processors are caused to implement the steps of a method according to claim 1.

* * * * *